United States Patent Office 3,290,002
Patented Dec. 6, 1966

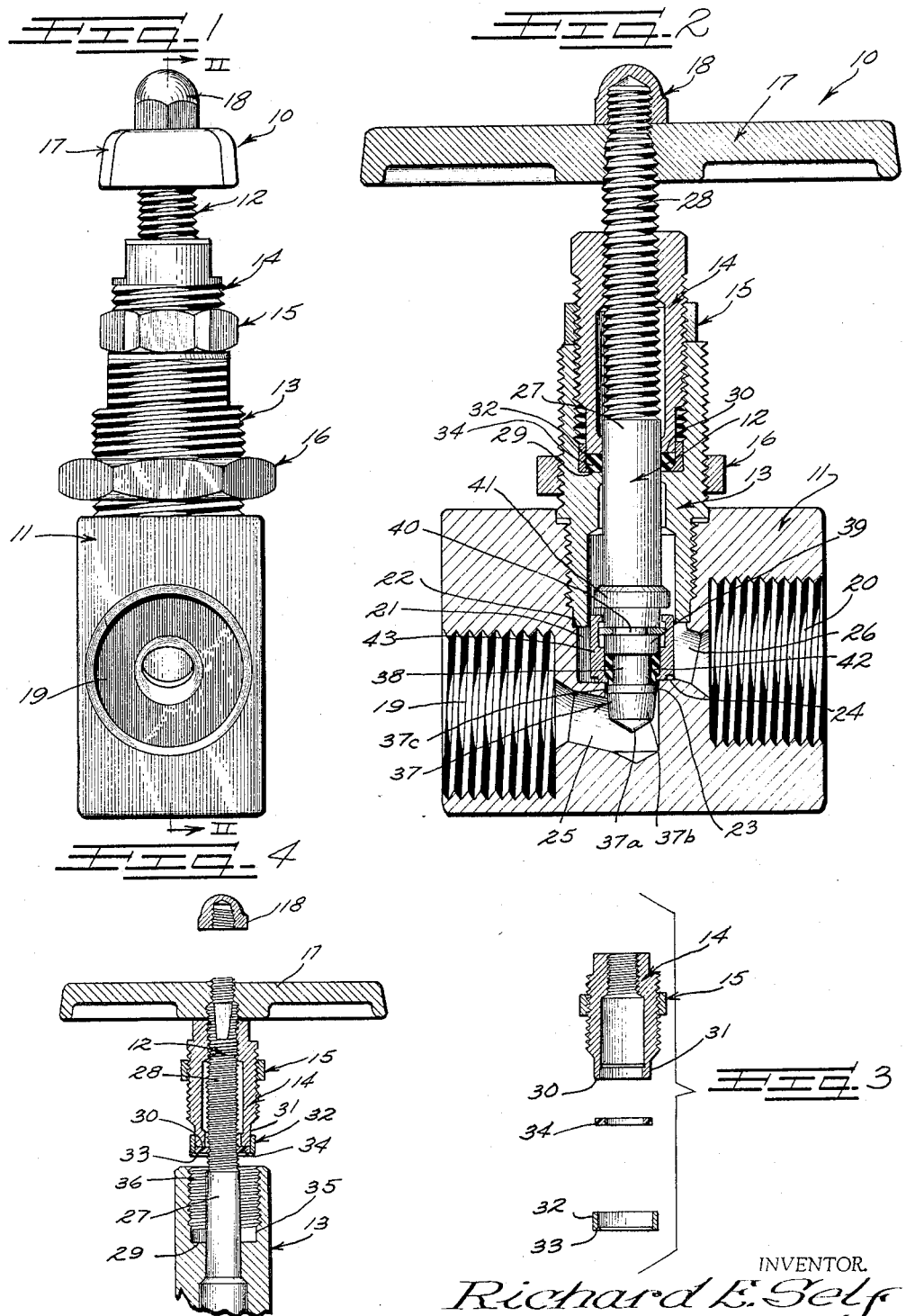

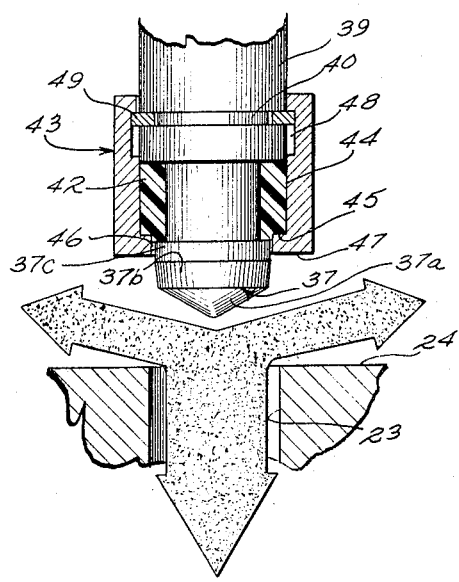
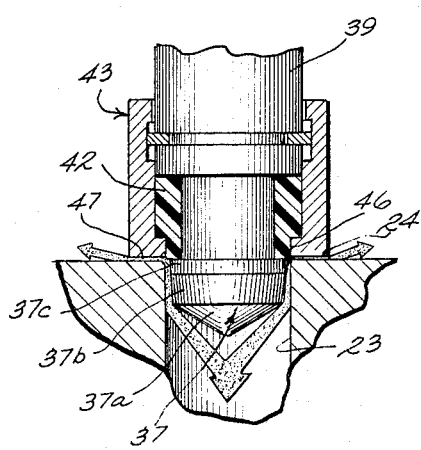
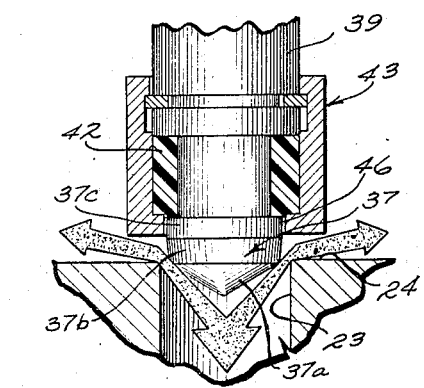
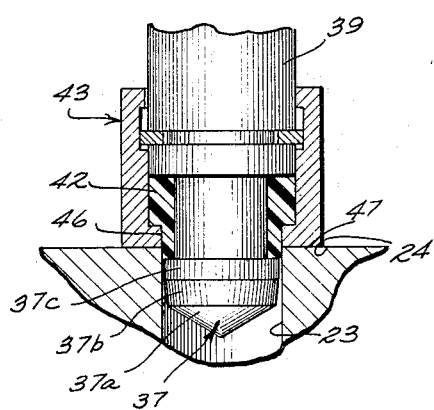
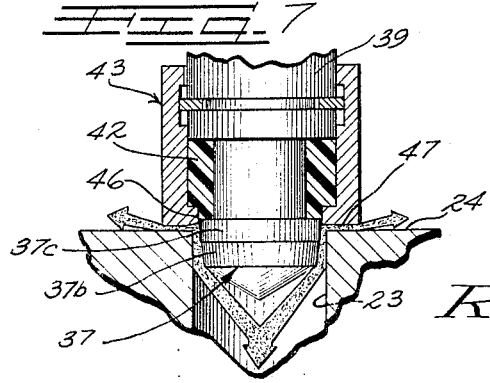

3,290,002
FLOW CONTROL VALVE
Richard E. Self, 3221 Brimhall Drive,
Los Alamitos, Calif.
Filed Nov. 19, 1963, Ser. No. 324,646
4 Claims. (Cl. 251—210)

This invention relates to a soft seat valve with completely encapsulated seat material protected against erosion in all flow positions of the valve but flowable beyond the capsule to provide an extremely tight seal. Particularly this invention relates to a throttling valve having a spindle sealed by a retractable easily replaced packing and having a port throttling nose backed by an encapsulated resiliently deformable sleeve which is extruded out of the capsule only in the closed position of the spindle to form a bubble tight seal.

This invention will be specifically described as embodied in a globe type throttling valve which is especially adapted for the handling of high pressure liquids or gases but it should be understood that the principles of this invention are not limited to any particular valve configuration or end usage. Thus the spindle packing and encapsulated soft seat features of this invention are generally useful in a wide range of valve designs and the scope of this invention is therefore not to be limited to the preferred illustrated embodiment.

In the preferred illustrated embodiment of the invention, a valve body is provided with a valve operating chamber between inlet and outlet ports. One of these ports has a seating face therearound and a spindle assembly has a nose adapted to enter this port for throttling flow. The spindle assembly includes a packing nut arrangement surrounding the spindle and including a seal ring carried in a retainer which is easily retracted and which forms a very effective replaceable seal or packing to prevent leakage from the valve operating chamber along the spindle. The spindle has a groove immediately following the nose thereof which is filled with a relatively rigid yet slightly compressible and resiliently flowable seat material. Polytetrafluoroethylene (Teflon) is a very effective soft seat material for the valves of this invention but other plastics and even metals might be used. The preferred materials have low coefficients of friction, some compressibility, a rebound or resilient capacity and flowability or extrudability. The seat mterial filling the groove is completely encapsulated by a housing sleeve which is slidably mounted on the spindle and has an end face adapted to seat on the port seat and receiving the spindle nose therethrough in relatively close clearance relation. The opening through the end face of the sleeve mates with the port of the valve body when the end face of the sleeve is bottomed on the port seat and coacts therewith to form a closed annular passage receiving the soft seat material when the spindle nose is moved into the port beyond the end face. The thus extruded seat material forms an extremely efficient bubble tight seal. The encapsulating sleeve for the soft seal material protects the material against erosion, washout, nibbling or surge from the fluid being handled and when the seal material is extruded out of the encapsulating sleeve there is no flow through the valve. The encapsulating sleeve is rotatably mounted on the spindle and has no galling effect on the seat material.

It is then an object of this invention to provide a soft seat fluid flow valve with a capsule which fully protects the soft seat material under all operating conditions of the valve.

Another object of this invention is to provide a spindle valve with an easily retractable and replaceable packing assembly and a throttling nose backed by a soft seat sleeve covered by a protective sleeve.

Another object of this invention is to provide an encapsulated soft seat valve with a fully opened position, a throttling position, a range of metering positions, and a completely closed position where the soft seat material is always fully protected against any effects of erosion, washout, or the like wear caused by the fluid being handled.

A still further object of this invention is to provide a spindle valve with a throttling nose that is backed by an encapsulated soft seat where the soft seat material is fully protected against the effects of the fluids such as high pressure gases handled by the valve.

Other and further objects and features of this invention will be apparent to those skilled in this art from the following detailed description of the annexed sheets of drawings which, by way of a preferred example only, illustrate one embodiment of the invention.

On the drawings:

FIGURE 1 is an end elevational view of a spindle valve of this invention.

FIGURE 2 is a vertical cross sectional view of the valve of FIG. 1 taken along the line of II—II of FIG. 1.

FIGURE 3 is an exploded vertical cross sectional view illustrating the spindle packing components of the valve.

FIGURE 4 is a fragmentary vertical cross sectional view, with parts in elevation and in disassembled relation, of the spindle mounting for the valve illustrating the manner in which the spindle packing is easily retracted for replacement.

FIGURE 5 is a fragmentary somewhat diagrammatic illustration of the valve in fully opened position and illustrating the manner in which the soft seat on the spindle is fully encapsulated.

FIGURE 6 is a view similar to FIG. 5 but illustrating a throttling position of the valve.

FIGURE 7 is a view similar of FIGS. 5 and 6 but illustrating a fine metering position of the valve.

FIGURE 8 is a view similar to FIGS. 5 to 7 but illustrating an ultra fine metering position of the valve.

FIGURE 9 is a view similar to FIGS. 5 to 8 but illustrating the fully closed position of the valve.

As shown on the drawings:

In FIGS. 1 and 2, the valve assembly 10 includes a valve body or housing 11, a spindle 12, a spindle mounting barrel 13 threaded into the housing, a packing nut 14 threaded into the barrel 13, a jam nut 15 threaded on the packing nut 14 and bottomed against the barrel 13 to lock the packing nut and barrel against relative rotation, a panel nut 16 threaded on the barrel adjacent the housing or body 11 for securing the assembly on a panel or the like, and a handle 17 secured on the top of the spindle 12 by an acorn nut 18 threaded on the free end of the spindle.

The valve housing or body 11 has an internally threaded inlet 19 in one end face and similar internally threaded outlet 20 in the opposite end face. As shown in FIG. 2, the body 11 has an operating chamber 21 between the inlet 19 and outlet 20 and opening through the top of the body. The barrel 13 is threaded into this opening and bottomed on a seat or shoulder 22 of the housing. A cylindrical port 23 surrounded by a flat annular face or seat 24 is provided at the bottom of the operating chamber 21 and a passageway 25 connects the port 23 with the inlet 19. One side of the operating chamber 21 is connected by a passageway 26 to the outlet opening 20. It will of course be understood that flow conditions could be reversed with the port 23 becoming an outlet port.

The spindle has a straight cylindrical portion 27 freely slidable in the barrel 13 and an externally threaded portion 28 threaded in the packing nut 14. The barrel 13 has a radial shoulder 29 under the packing nut 14 forming a packing seat. The nut 14 in turn has a cylindrical end face 30 confronting said seat 29.

In accordance with this invention a very effective packing is provided for the spindle portion 27 to prevent leakage along the spindle through the barrel. To this end, as best shown in FIGS. 3 and 4, the packing nut 14 immediately adjacent the end face 30 has a reduced diameter cylindrical side wall 31 receiving thereon a metal retaining ring 32 with an inturned bottom lip 33. A packing ring 34 of deformable material such as nylon, Teflon, or the like plastic or even a soft deformable metal, is fitted in the retaining ring to rest on the lip 33 thereof. The ring 32 has an internal diameter providing a slip fit on the cylindrical side wall 31 and the ring can be deformed out of round to effect an interference fit to fixedly secure it to the wall 31.

The barrel 13 has a plain cylindrical side wall 35 immediately adjacent the seat 29 and under the threaded portion 36 which receives the threaded packing nut 14, which wall 35 is of sufficiently large diameter to freely receive the retaining ring 32.

The packing ring 34 fits snugly in the retaining ring 32 and has an internal diameter snugly receiving the portion 27 of the spindle 12.

To set the packing assembly in proper sealing relationship between the barrel 13 and the spindle portion 27 it is only necessary to insert the spindle into the barrel, place the packing ring 34 into the retaining ring, assemble the retaining ring on the wall 31 of the packing nut 14, thread the packing nut around the spindle and into the barrel and tighten the packing nut sufficiently in the barrel so that the packing ring 34 will be loaded between the seat 29 and the end face 30. Since the packing ring 34 is slightly deformable it will accommodate itself to a tight fit between the opposed sealing faces 29 and 30 of the barrel and nut and around the spindle portion 27. To remove the packing for replacement it is only necessary to unthread the packing nut from the barrel whereupon the packing assembly will be retracted with the packing nut as illustrated in FIG. 4.

The spindle 12, as shown in FIG. 2, has a leading end nose 37 with a relatively flat pointed leading edge 37a followed by a tapered side wall 37b which diverges to a cylindrical side wall or head 37c fitting freely into the port 23 but in relatively close relationship with the port wall.

The nose 37 is immediately followed on the spindle by a reduced diameter cylindrical groove 38 terminating at its top and at a piston head 39 of larger diameter than the head portion 37c of the nose 37. The opposed heads 37c and 39 provide confronting radial shoulders.

The piston head portion 39 has a narrow groove 40 therein and extends to a large diameter collar 41 at the bottom of the cylindrical spindle portion 27.

In accordance with this invention a Teflon seal 42 fills the groove 38 and is confined between the shoulders provided by the heads 37c and 39. The Teflon filling is in the form of a cylindrical sleeve whose free outer diameter is substantially the same as the diameter of the piston head 39. This sleeve or fitting 42 constitutes the soft seat of the valve of this invention.

In accordance with this invention the soft seat 42 is encapsulated by a metal sleeve 43 which is slidably mounted on the spindle head 39 under the collar 41.

As more clearly shown in FIGS. 5 to 9 the encapsulating sleeve 43 has a cylindrical bore 44 extending from the open top thereof to an internal radial shoulder 45 which extends inwardly to a smaller diameter cylindrical bore 46 that continues to a flat bottom or end face 47. The bore 44 has an internal groove 48 near the top end thereof and a snap ring 49 in the groove 40 of the spindle head 39 extends into the groove 48 to retain the sleeve 43 on the spindle head 39 while allowing limited axial movement and free rotation of the sleeve on the spindle.

The bore 46 of the sleeve is of sufficiently large diameter to freely receive the nose 37 of the spindle therethrough with the head portion 37c of the spindle nose having a fairly close fitting relationship with the bore.

When the valve is in the fully opened position of FIG. 5, the sleeve 43 hangs freely on the spindle head 39 and is sufficiently long so that its end face 47 will be adjacent the bottom of the spindle portion 37c and this spindle portion will lie within the bore 46. In this full open position the Teflon sleeve 42 is relaxed to its free dimension and is completely encapsulated within the sleeve 43. The free state form of the Teflon sleeve may include a reduced diameter pilot portion seated in the bore 46 of the sleeve as shown to facilitate translation of the main body of the sleeve through the bore under closing loads. It will be noted that in this fully opened position of FIG. 5 the end face 47 of the sleeve is spaced materially above the port seat 24 and the nose 37 is retracted completely out of the port 23 to accommodate free flow of fluid in all directions as shown by the arrows and a full hole diameter is developed even for high velocity flows.

As shown in FIG. 6 when the spindle is shifted to position the nose 37 with its pointed end 37a in the port 23, its tapered portion 37b adjacent the seat 24 but still spaced from the seat and its head 37c still within the bore 46, the flow through the port 23 shown by the arrows is throttled but the Teflon sleeve 42 still remains in completely encapsulated condition in the sleeve 43 and in relaxed condition.

Then, as shown in FIG. 7, when the spindle is shifted to further lower the nose 37 into the port 23 and to lightly bottom the end face 47 of the sleeve 43 on the seat 24, the head 39 of the spindle acts as a piston against the Teflon 42 causing the same to compress and permitting the spindle head 37c to move partly out of the sleeve bore 46. As shown some of the Teflon 42 will then flow into the bore 46 but the Teflon will still be encapsulated in the sleeve 43 since the head 37b remains partially within the bore 46. Under these conditions a fine metering of flow through the port 23 is obtained as shown by the arrows with both the nose of the spindle and the end face 47 of the sleeve cooperating to control the metering.

An ultra fine metering is obtained as shown in FIG. 8 when the spindle is shifted to seat the end face 47 of the sleeve 43 more firmly against the port seat 24. In this position the portion 37c of the spindle nose 37 is just emerging from the bore 46 of the encapsulating sleeve 43 and while the piston head 39 has forced more of the Teflon sleeve 42 to flow into the bore 46, the Teflon is still fully encapsulated in the sleeve. As shown by the arrows fluid flow through the port is substantially stopped and a very fine metering is obtainable.

In the position shown in FIG. 9 the spindle has been moved to position the nose 37 completely in the port 23 and the end face 47 of the sleeve is tightly pressed against the port seat 24. It will also be noted that the bore 46 of the sleeve mates with the port 23 and while a portion of the Teflon seat 42 has been extruded through the bore 46 and into the port 23, the Teflon is still fully protected from erosion, washout, or the like, because no flow can occur. In addition, the Teflon is tightly engaged with the wall of the bore 46, the wall of the port 23 and the portion 37c of the spindle nose 37. A very tight seal is insured.

Since the sleeve 43 is freely rotatable on the spindle portion 39 it will have no galling effect on either the seat 24 or the Teflon 42.

The Teflon 42 is sufficiently resilient so that when the valve is open it will spring back to its relaxed position of FIGS. 5 and 6 to be again completely encapsulated within the sleeve 43.

In the event of loss or failure of the soft seat material, the valve can still be closed by bottoming the collar 41 of the spindle against the sleeve 43 and thereby forcing the end face 47 of the sleeve against the port seat 24. This use of the collar 41 is for emergency purposes only.

The Teflon sleeve 42 can easily be replaced by removing the barrel and spindle assembly from the housing and by inserting a screwdriver between the barrel and the sleeve 43 to snap the sleeve off of the retainer or snap ring 49 thereby exposing the Teflon sleeve 42 for replacement. To reassemble a new soft seat, the new Teflon sleeve can be slipped over the nose of the spindle into the groove 38 and the sleeve 43 can be placed over the spindle portion 39 against the snap ring. Then when the spindle assembly is remounted in the housing it can be lowered to bottom the sleeve 43 on the seat 24 whereupon a further tightening of the spindle will cause the retainer ring to snap into the groove 48 of the sleeve. An audible click will signify that the assembly has been completed.

From the above descriptions it will therefore be understood that this invention provides an improved soft seat flow control valve with an easily replaceable packing and seat assembly and wherein the packing is automatically retracted upon disassembly and the seat is completely encapsulated against erosion or wear from fluid flow.

I claim as my invention:

1. A sealing joint having a surface intersected by a passage,
   a spindle member having a head portion and being movable axially into and out of said passage,
   said spindle member having a reduced section forming an annular recess axially inwardly of said head portion,
   a ring-shaped volume of highly viscous, flowable, compressible material filling all of said recess and in sufficient excess to project radially outwardly of said recess,
      said head portion having a radial shoulder at one end of said recess,
   a sleeve encapsulating and filled by said ring-shaped volume and including a wall forming a cylinder for said ring-shaped volume, and
      an end wall extending radially inwardly to a smaller diameter cylindrical bore,
      said bore and said head portion having confronting axially extending concentric surfaces sized to have a sliding fit with one another,
   whereby said ring-shaped volume is protected against erosion by any fluids flowing through said passage,
      said bore terminating in a flat radial end face on said sleeve overlying and engageable with said surface,
   and shoulder means on said spindle member forming a piston head overlying said ring-shaped volume and having an effective area greater than the corresponding oppositely disposed radial shoulder,
      said piston head being relatively movable axially after said end face engages said surface to compress said ring-shaped volume,
   thereby separating said axially extending confronting surfaces while translating said spindle member into said passage,
      the compression of said ring-shaped volume building up contact pressure between said end face and said surface and carrying said ring-shaped volume into said passage.

2. A sealing joint as defined in claim 1 wherein said material comprises Teflon.

3. A sealing joint as defined in claim 1 and further characterized by
   said spindle member being rotatable,
   and screw threaded actuator means for axially moving said spindle member into and out of said passage upon rotation of said actuator means.

4. A sealing joint as defined in claim 3 and further characterized by
   said sleeve and said spindle member having a coupling connection affording limited relative axial movement and free relative rotational movement,
whereby rotational adjustment on said actuator means to control the contact pressure between said end face and said surface will regulate fine and ultra fine metering through the passage.

References Cited by the Examiner

UNITED STATES PATENTS

| | | | |
|---|---|---|---|
| 934,620 | 9/1909 | Mueller | 251—210 X |
| 1,106,933 | 8/1914 | Farley | 251—214 |
| 1,301,278 | 4/1919 | Labus | 251—332 |
| 1,686,849 | 10/1928 | Frauenheim | 251—332 |
| 2,720,219 | 10/1955 | Grove et al. | 251—210 X |
| 2,885,176 | 5/1959 | Bryant | 251—332 X |
| 3,057,596 | 9/1962 | Tobin | 251—214 |
| 3,084,903 | 4/1963 | Parks | 251—332 X |

FOREIGN PATENTS 463,343  7/1930  Germany.

M. CARY NELSON, *Primary Examiner.*

ARNOLD ROSENTHAL, *Examiner.*